(12) United States Patent
Otake et al.

(10) Patent No.: US 7,082,754 B2
(45) Date of Patent: Aug. 1, 2006

(54) REGENERATION OF DIESEL PARTICULATE FILTER

(75) Inventors: Makoto Otake, Yokohama (JP);
Junichi Kawashima, Yokosuka (JP);
Naoya Tsutsumoto, Yokohama (JP);
Terunori Kondou, Yokohama (JP);
Shouichirou Ueno, Yokohama (JP);
Takao Inoue, Yokohama (JP);
Toshimasa Koga, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 64 days.

(21) Appl. No.: 11/004,860

(22) Filed: Dec. 7, 2004

(65) Prior Publication Data
US 2005/0126162 A1    Jun. 16, 2005

(30) Foreign Application Priority Data
Dec. 10, 2003   (JP)   ............................. 2003-412120

(51) Int. Cl.
*F01N 3/00* (2006.01)
(52) U.S. Cl. ............................ 60/295; 60/274; 60/287; 60/297; 60/311
(58) Field of Classification Search ................. 60/274, 60/276, 277, 278, 280, 287, 291, 295, 297, 60/311
See application file for complete search history.

(56) References Cited

U.S. PATENT DOCUMENTS

| | | | |
|---|---|---|---|
| 5,716,586 A | * | 2/1998 | Taniguchi ................... 422/173 |
| 6,247,311 B1 | | 6/2001 | Itoyama et al. |
| 6,438,948 B1 | * | 8/2002 | Ono et al. ..................... 60/311 |
| 6,763,659 B1 | * | 7/2004 | Watanabe et al. ............. 60/297 |
| 6,910,329 B1 | * | 6/2005 | Bunting et al. ............... 60/297 |
| 6,983,591 B1 | * | 1/2006 | Kondo et al. .................. 60/295 |
| 2002/0078681 A1 | | 6/2002 | Carberry et al. |
| 2003/0145582 A1 | | 8/2003 | Bunting et al. |

FOREIGN PATENT DOCUMENTS

| | | |
|---|---|---|
| EP | 1 316 692 A1 | 6/2003 |
| JP | 5-44437 A | 2/1993 |
| JP | 2003-286887 A | 10/2003 |

OTHER PUBLICATIONS

U.S. Appl. No. 11/003,349, filed Dec. 6, 2004, Tsutsumoto et al.
U.S. Appl. No. 11/010,348, filed Dec. 14, 2004, Otake et al.

* cited by examiner

*Primary Examiner*—Binh Q. Tran
(74) *Attorney, Agent, or Firm*—Foley & Lardner LLP (57) ABSTRACT

This invention relates to regeneration of a filter (41) which traps particulate matter contained in the exhaust gas of a diesel engine (1) for a vehicle. A programmable controller (31) performs filter regeneration appropriately in accordance with the running pattern of the vehicle by calculating a first parameter indicating the frequency with which the diesel engine (1) performs an idling operation over a predetermined time period up to the present (S7), calculating a second parameter indicating the temperature environment of the filter (41) over a predetermined time period up to the present (S3), and determining whether or not the filter (41) can be regenerated completely on the basis of the first parameter and second parameter (S13).

11 Claims, 8 Drawing Sheets

32 ACCELERATOR PEDAL DEPRESSION SENSOR
33 CRANK ANGLE SENSOR
34 COOLANT TEMPERATURE SENSOR
35 AIR FLOWMETER
36 DIFFERENTIAL PRESSURE SENSOR
37, 38 TEMPERATURE SENSOR

FIG.1

32 ACCELERATOR PEDAL DEPRESSION SENSOR
33 CRANK ANGLE SENSOR
34 COOLANT TEMPERATURE SENSOR
35 AIR FLOWMETER
36 DIFFERENTIAL PRESSURE SENSOR
37, 38 TEMPERATURE SENSOR

REGENERATION OF DIESEL PARTICULATE FILTER

FIELD OF THE INVENTION

This invention relates to regeneration of a diesel particulate filter installed in an exhaust passage of a diesel engine.

BACKGROUND OF THE INVENTION

Tokkai Hei 05-44437 published by the Japan Patent Office in 1993 discloses a device which processes particulate matter contained in the exhaust gas discharged from a vehicle diesel engine.

This device comprises a diesel particulate filter (DPF) which traps the particulate matter in the exhaust passage of the diesel engine. When a predetermined amount of particulate matter deposits on the DPF, the particulate matter is burnt by increasing the exhaust gas temperature by operating the intake throttle so as to raise the temperature of the DPF. This treatment is called DPF regeneration treatment.

SUMMARY OF THE INVENTION

Regeneration treatment may be interrupted while a large amount of particulate matter remains deposited in the DPF. In the DPF, when regeneration is interrupted, particulate matter remains on the outer circumference of the upstream part of the DPF which has a low bed temperature and cannot be re-burnt. If the interruption is repeated several times, there may be a part of the DPF where the deposition amount is far in excess of the maximum deposition. As a result, the temperature gradient inside the DPF during regeneration becomes large, creating an undesirable effect on the heat resistance of the filter.

The main cause of an interruption in regeneration is a decrease in the temperature of the exhaust gas below the temperature required for regeneration of the DPF during DPF regeneration. For complete regeneration of the DPF, the vehicle needs to run continuously in almost the same state during the time period required for regeneration.

The running patterns of the vehicle include high speed running, low vehicle speed running as in urban areas, and an intermediate running pattern between high speed running and low speed running as in suburban areas. If regeneration of the DPF is performed uniformly during these different running patterns, the opportunity for interruption of DPF regeneration will inevitably increase.

It is therefore an object of this invention to perform regeneration of DPF properly according to a running pattern of a vehicle.

In order to achieve the above object, this invention provides a control device for a regeneration mechanism of a filter which traps particulate matter contained in an exhaust gas of a diesel engine for a vehicle. The device comprises a first sensor which detects whether or not the diesel engine is performing an idling operation, a second sensor which detects a temperature of the filter, a programmable controller which controls the regeneration mechanism.

The controller is programmed to calculate, on the basis of an output of the first sensor, a first parameter indicating a frequency with which the diesel engine performs an idling operation over a predetermined time period up to the present, calculate, on the basis of an output of the second sensor, a second parameter indicating a temperature environment of the filter over a predetermined time period up to the present, determine whether or not a complete regeneration of the filter is possible on the basis of the first parameter and second parameter, and control the regeneration mechanism to perform complete regeneration of the filter, when the complete regeneration of the filter is determined to be possible.

This invention also provides a control method for the regeneration mechanism. The method comprises determining whether or not the diesel engine is performing an idling operation, determining a temperature of the filter, calculating, on the basis of an output of the first sensor, a first parameter indicating a frequency with which the diesel engine performs an idling operation over a predetermined time period up to the present, calculating, on the basis of an output of the second sensor, a second parameter indicating a temperature environment of the filter over a predetermined time period up to the present, determining whether or not a complete regeneration of the filter is possible on the basis of the first parameter and second parameter, and controlling the regeneration mechanism to perform complete regeneration of the filter, when the complete regeneration of the filter is determined to be possible.

The details as well as other features and advantages of this invention are set forth in the remainder of the specification and are shown in the accompanying drawings.

DESCRIPTION OF THE PREFERRED EMBODIMENTS

Figure 1:
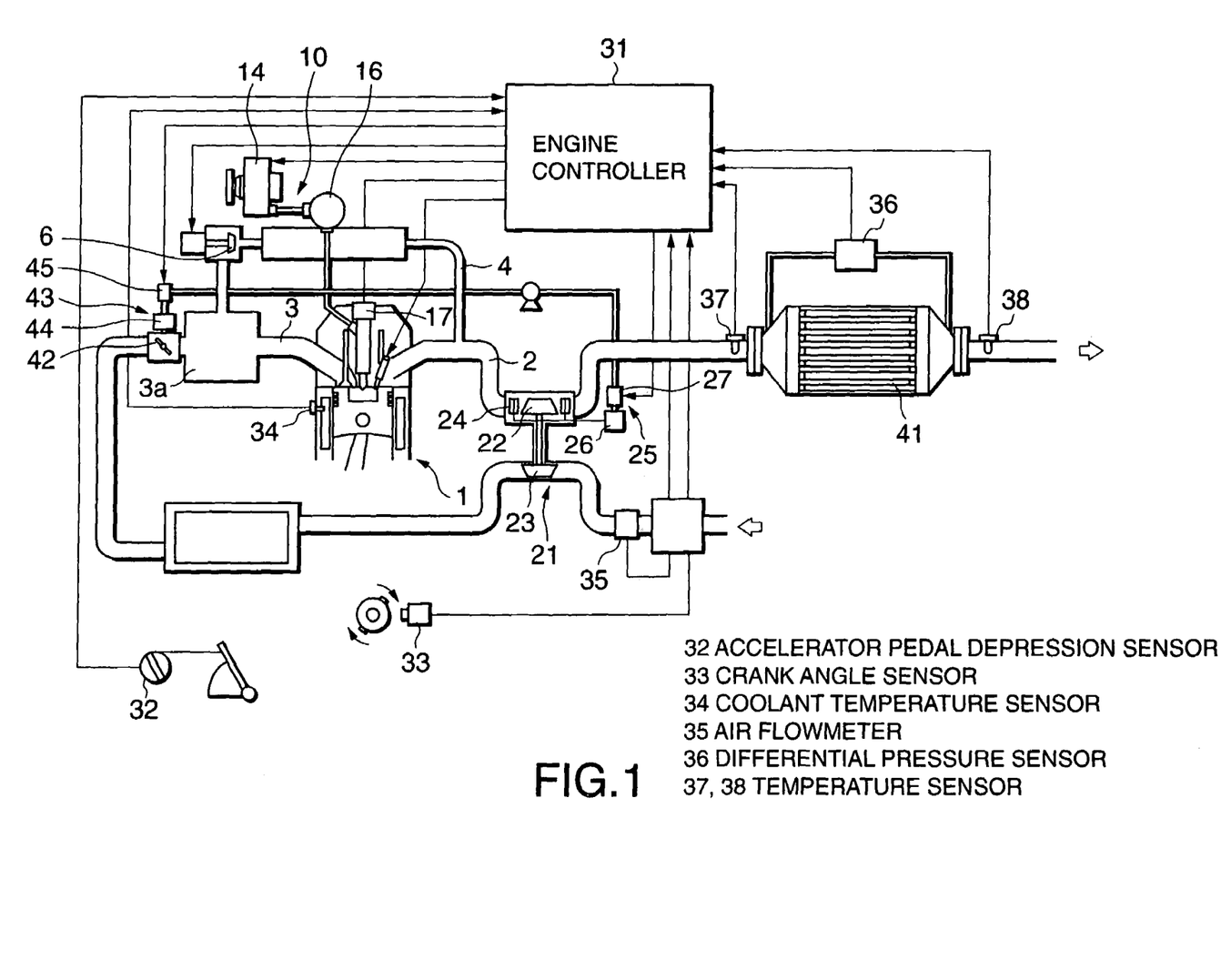
FIG. 1 is a schematic diagram of an exhaust gas purification device for a vehicle to which this invention is applied.

Referring to FIG. 1 of the drawings, a multi-cylinder diesel engine 1 for vehicles is provided with an exhaust passage 2 and intake passage 3. The intake passage 3 is provided with a collector part 3a to distribute intake air to each cylinder. The exhaust passage 2 and the collector part 3a are connected by an exhaust gas recirculation (EGR) passage 4.

A diaphragm type EGR valve 6 is installed in the EGR passage 4. The EGR valve 6 is operated by a pressure limiting valve and diaphragm-type actuator according to a duty signal from an engine controller 31.

The engine 1 is provided with a common rail fuel injection device 10. The fuel injection device 10 is provided with a supply pump 14, a common rail (accumulator) 16, and a nozzle 17 provided for every cylinder. Fuel pressurized by the supply pump 14 is distributed to each nozzle 17 via the common rail 16.

The nozzle 17 is provided with a needle valve, a nozzle chamber, a fuel supply passage leading to the nozzle chamber, a retainer, a hydraulic piston and a return spring.

A three-way valve is a valve which selectively connects the common rail 16 and a drain to the fuel supply passage, and in the OFF state, maintains the needle valve in the seated position by means of the high-pressure fuel pressure of the common rail 16 via the fuel supply passage and the nozzle chamber. In the ON state, by releasing this pressure to the drain, the needle valve is lifted and the fuel in the nozzle chamber is injected into the cylinder. The engine 1 burns the injected fuel in the cylinder by compression ignition.

The fuel injection timing of the nozzle 17 is determined by the change-over timing from OFF to ON of the three-way valve, and the fuel injection amount is determined by the duration of the ON state of the three-way valve. If the pressure of the common rail 16 is equal, the fuel injection amount increases as the duration of the ON state increases. The ON and OFF states of the three-way valve are changed over by a signal from the engine controller 31.

This type of common rail fuel injection device 10 is known from U.S. Pat. No. 6,247,311.

A turbine 22 of a variable capacity turbocharger 21 is provided in the exhaust passage 2 downstream of the EGR passage 4. The variable capacity turbocharger 21 is further provided with a compressor 23 installed in the intake passage 3. The turbine 22 transforms the energy of the flow of exhaust gas into rotational energy, and drives the compressor 23 on the same axis using this rotational energy.

A variable nozzle 24 driven by an actuator 25 is installed at the scroll inlet of the turbine 22.

The actuator 25 comprises a diaphragm actuator 26 and a pressure limiting valve 27 which adjusts the control pressure to the diaphragm actuator 26, and varies the nozzle opening so that a predetermined turbocharging pressure can be obtained in the low rotation speed region of the engine 1. Specifically, at a low rotation speed, the nozzle opening is narrowed so that the flow velocity of exhaust gas introduced into the turbine 22 is increased, and at a high rotation speed, the nozzle opening is widened so that the exhaust gas is introduced into the turbine 22 without resistance.

The pressure limiting valve 27 adjusts the pressure of the diaphragm actuator 26 according to a duty signal from the engine controller 31 so that the opening of the variable nozzle 24 is adjusted to a target nozzle opening.

An intake throttle 42 driven by an actuator 43 is formed in the inlet of the collector part 3a.

The actuator 43 comprises a diaphragm actuator 44 which drives the intake throttle 42 according to the control pressure, and a pressure limiting valve 45 which adjusts the control pressure to the diaphragm actuator 44, according to a duty signal from the engine controller 31 so that the intake throttle 42 has a target opening.

A diesel particulate filter (DPF) 41 which traps particulate matter in the exhaust gas is installed in the exhaust passage 2 downstream of the turbine 22.

The engine controller 31 comprises a microcomputer provided with a central processing unit (CPU), read-only memory (ROM), random-access memory (RAM) and an input/output interface (I/O interface).

The engine controller 31 controls the opening of the EGR valve 6, the fuel injection timing and fuel injection amount of the nozzle 17, the opening of the variable nozzle 24 of the turbocharger 21, and the opening of the intake throttle 42. The particulate matter deposited on the DPF 41 is burned occasionally via these controls, and the DPF 41 is regenerated to a state in which it can again trap particulate matter.

To perform the above control, detection signals from various sensors are inputted into the engine controller 31. These sensors include an accelerator pedal depression sensor 32 which detects a depression amount of an accelerator pedal with which the vehicle is provided, a crank angle sensor 33 which detects a rotation speed Ne and crank angle of the diesel engine 1, a coolant temperature sensor 34 which detects a cooling water temperature of the engine 1, an air flowmeter 35 which detects an intake air amount Qa of the intake passage 2, a differential pressure sensor 36 which detects a differential pressure $\Delta P$ upstream and downstream of the DPF 41, a temperature sensor 37 which detects an exhaust gas temperature Tin at the inlet of the DPF 41, and a temperature sensor 38 which detects an exhaust gas temperature Tout at the outlet of the filter 41.

When the particulate matter deposition amount of the DPF 41 reaches a predetermined amount, the engine controller 31 starts regenerating the DPF 41, burns the particulate matter deposited on the DPF 41, and thereby removes it from the DPF 41.

In the prior art device, as described above, if the exhaust gas temperature during regeneration of the DPF falls below the temperature required for regeneration of the DPF, regeneration is interrupted while particulate matter is deposited locally in the DPF.

Figure 8:
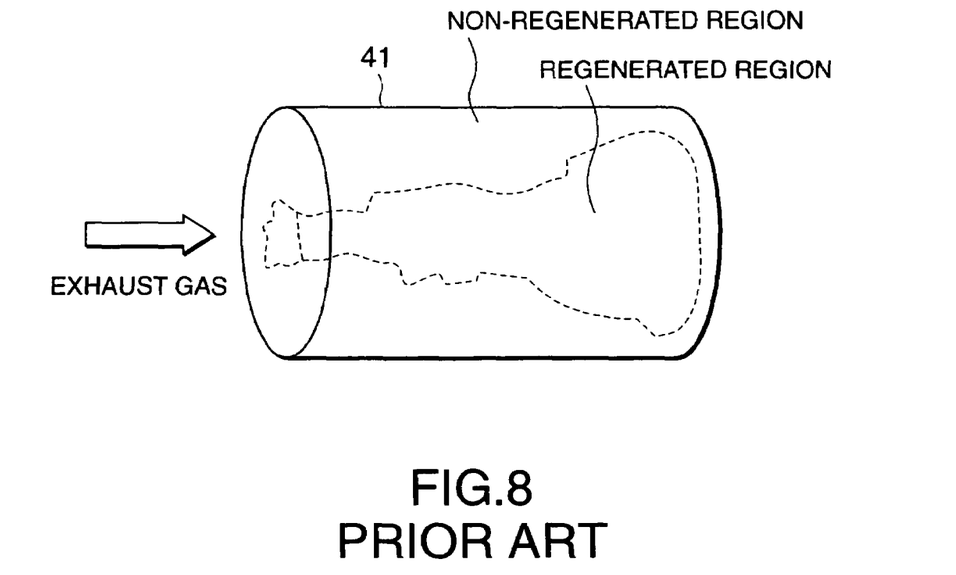
FIG. 8 is a perspective view of a DPF showing a particulate matter deposition state in the DPF when regeneration is interrupted according to the prior art.

Referring to FIG. 8, an interruption in regeneration of the DPF causes particulate matter to remain without burning in the upstream circumferential part of the DPF which has a low bed temperature.

Figure 9:
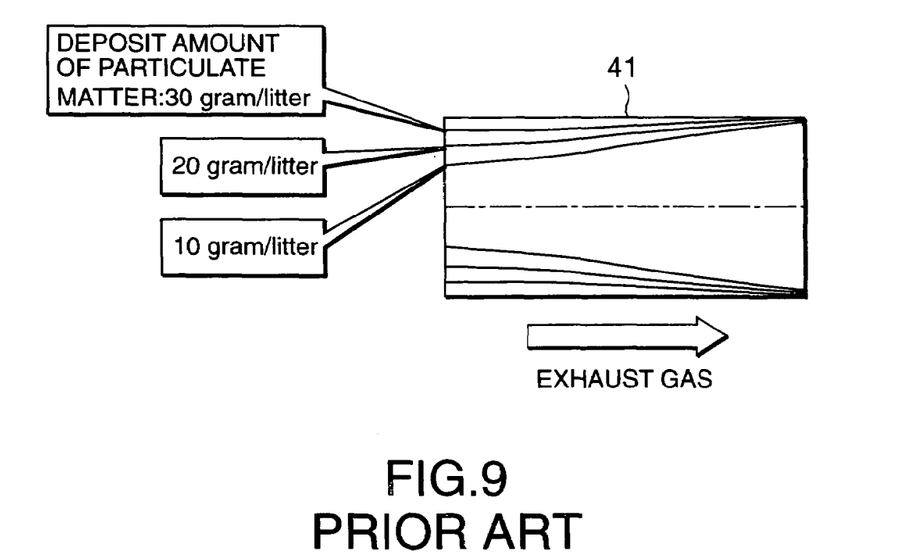
FIG. 9 is a longitudinal sectional view of the DPF showing the distribution of the particulate matter deposition amount during repeated interruption of DPF regeneration according to the prior art.

This part is a non-regenerated region. If regeneration is interrupted repeatedly, as shown in FIG. 9, a large amount of particulate matter deposits locally.

Figure 10:
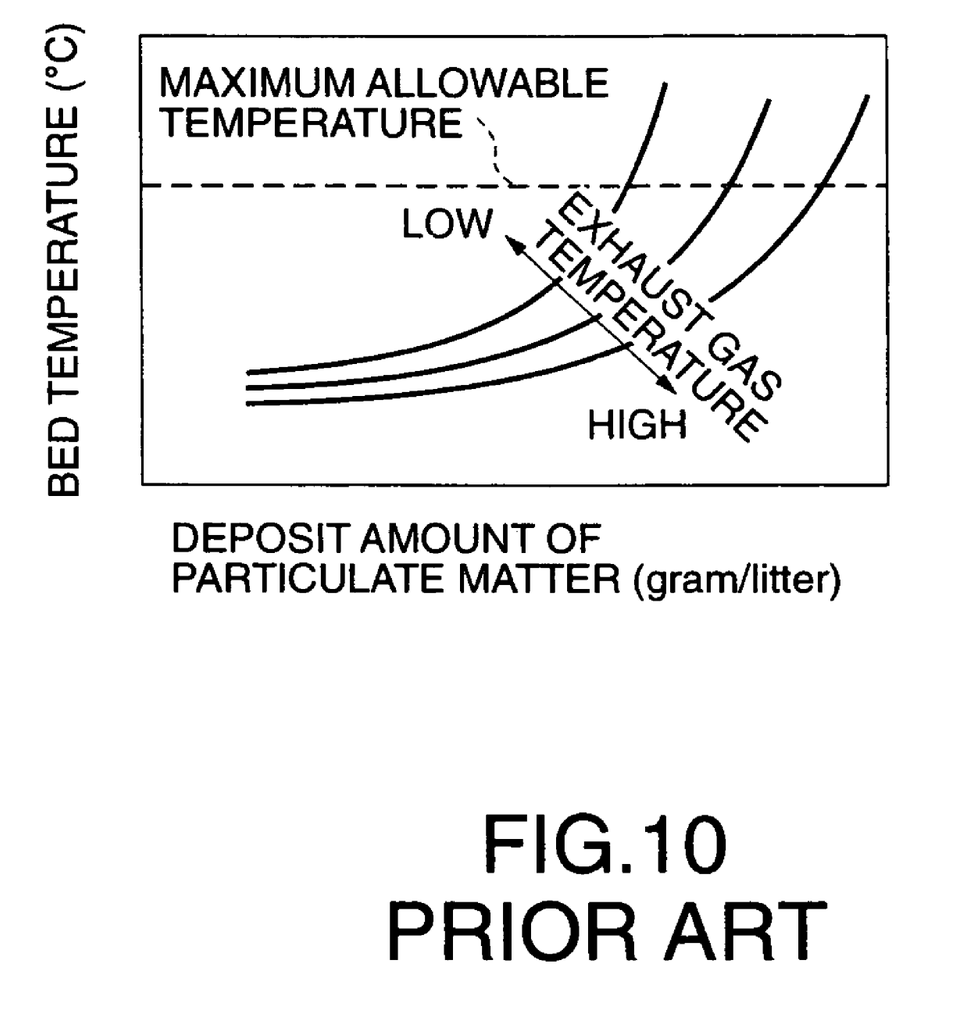
FIG. 10 is a diagram describing the relation of the particulate matter deposition amount, exhaust gas temperature and DPF bed temperature according to the prior art.

Referring to FIG. 10, when the particulate matter deposition amount of the DPF increases, the exhaust gas temperature, which reaches the maximum temperature allowed by the DPF, falls.

In other words, if the particulate matter deposition amount increases, the bed temperature of the DPF reaches the maximum allowable temperature at a lower exhaust gas temperature.

When a large amount of particulate matter deposits locally, the temperature gradient inside the DPF increases, and as a result, the bed temperature of one part exceeds the maximum allowable temperature, creating an undesired effect on the heat resistance of the DPF.

To avoid this problem inherent in the prior art device, this invention performs the following control.

The temperature at which the particulate matter trapped by the DPF 41 begins to burn is about 350 degrees centigrade, and the temperature at which particulate matter burns actively is 650 degrees centigrade or more.

The regeneration time required by the DPF 41 is five to ten minutes.

In this embodiment, the running pattern of the vehicle for the past five minutes up to the present is determined using the bed temperature of the DPF 41 and the idling operation frequency of the diesel engine 1 as parameters. Meanwhile, a determination is made as to whether or not regeneration of the DPF 41 is required. When it is determined that regeneration of the DPF 41 is required, a regeneration mode is determined according to the vehicle running pattern for the past five minutes, and regeneration of the DPF 41 is executed in the determined regeneration mode.

Referring to the flowcharts in FIGS. 2, 5, and 7, the routines executed by the engine controller 31 to perform the above control will now be described.

Figure 2:
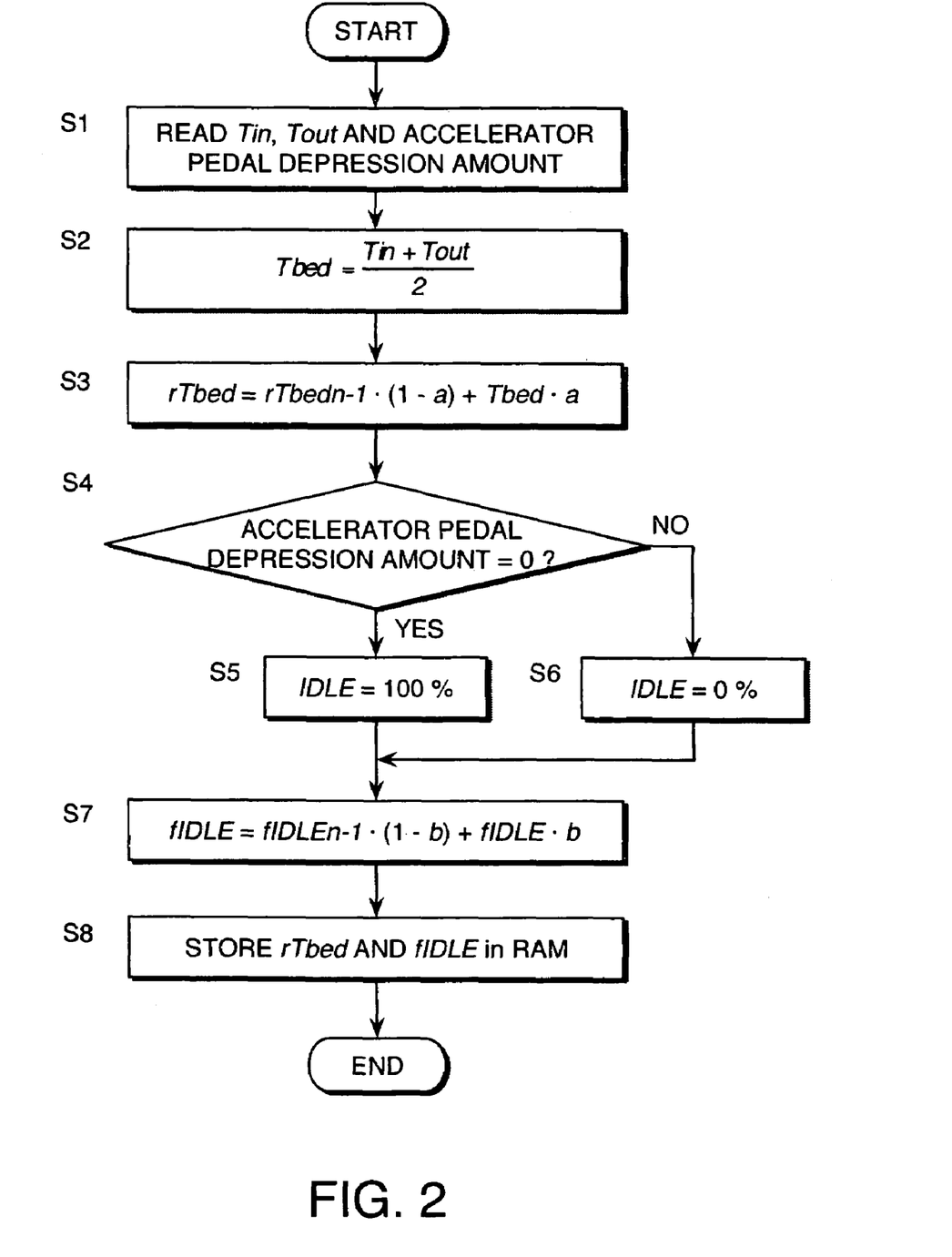
FIG. 2 is a flowchart describing a calculation routine of a bed temperature first order delay process value rTbed and an idling operation frequency first order delay process value fIDLE performed by a controller according to this invention.

FIG. 2 shows a processing routine for determining the bed temperature and idling operation frequency. The engine controller 31 executes this routine at ten-millisecond intervals while the diesel engine 1 is operative.

In a step S1, the engine controller 31 reads the inlet temperature Tin of the DPF 41, detected by the temperature sensor 37, the outlet temperature Tout of the DPF 41, detected by the temperature sensor 38, and an idling operation determination parameter.

The idling operation determination parameter is a parameter indicating whether or not the diesel engine 1 is in an idling state. In this embodiment, the accelerator pedal depression amount, detected by the accelerator pedal depression sensor 32, is read as the idling operation determination parameter.

In a step S2, the engine controller 31 determines a bed temperature Tbed of the DPF 41 by averaging the inlet temperature Tin and outlet temperature Tout.

In a step S3, the engine controller 31 calculates a bed temperature first order delay process value rTbed, obtained by implementing first order delay processing on the bed temperature Tbed of the filter 41, using the following equation (1).

$$rTbed = rTbed_{n-1} \cdot (1-a) + Tbed \cdot a \quad (1)$$

where $rTbed_{n-1}$=rTbed calculated during immediately preceding execution of the routine, and a=weighted average coefficient (0≦a≦1).

Figure 3:
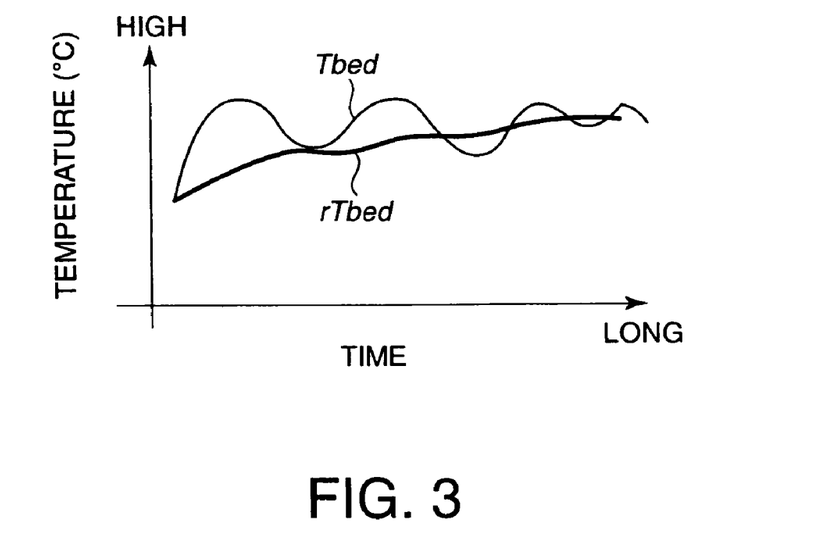
FIG. 3 is a timing chart describing first order delay processing of the DPF bed temperature according to this invention.

Referring to FIG. 3, the bed temperature first order delay process value rTbed will be described.

When the vehicle accelerates and decelerates repeatedly while driving through an urban area, the bed temperature Tbed undulates according to the changes in operating condition. Conversely, the bed temperature first order delay process value rTbed is a value in which the influence of the acceleration and deceleration is evened out. As the weighted average coefficient a increases, the bed temperature first order delay process value rTbed nears the bed temperature Tbed. The weighted average coefficient a is set by selecting an optimal value through experiment such that the bed temperature first order delay process value rTbed properly represents the running pattern of the past five minutes. The bed temperature Tbed at the start of an execution of the routine is used as the initial value of the bed temperature first order delay process value rTbed.

Steps S4–S6 are steps for calculating an idling operation frequency IDLE.

First, in the step S4, the engine controller 31 determines whether or not the accelerator pedal depression amount, read in the step S1 as the idling operation determination parameter, is zero, indicating that the diesel engine 1 is performing an idling operation. To increase the determination precision of an idling operation, the rotation speed Ne of the diesel engine 1 may be added to the determination, and if the vehicle comprises a vehicle speed sensor, then the vehicle speed may also be added to the determination.

If it is determined in the step S4 that the diesel engine 1 is in an idling state, the engine controller 31 sets the idling operation frequency IDLE to 100 percent in the step S5. If it is determined in the step S4 that the diesel engine 1 is not in an idling state, the engine controller 31 sets the idling operation frequency IDLE to 0 percent in the step S6.

In a step S7, the engine controller 31 calculates an idling operation frequency first order delay process value fIDLE (%), obtained by implementing first order delay processing on the idling operation frequency IDLE, using the following equation (2).

$$fIDLE = fIDLE_{n-1} \cdot (1-b) + fIDLE \cdot b \quad (2)$$

where $fIDLE_{n-1}$=fIDLE calculated during immediately preceding execution of the routine, and b=weighted average coefficient (0≦b≦1).

Figure 4:
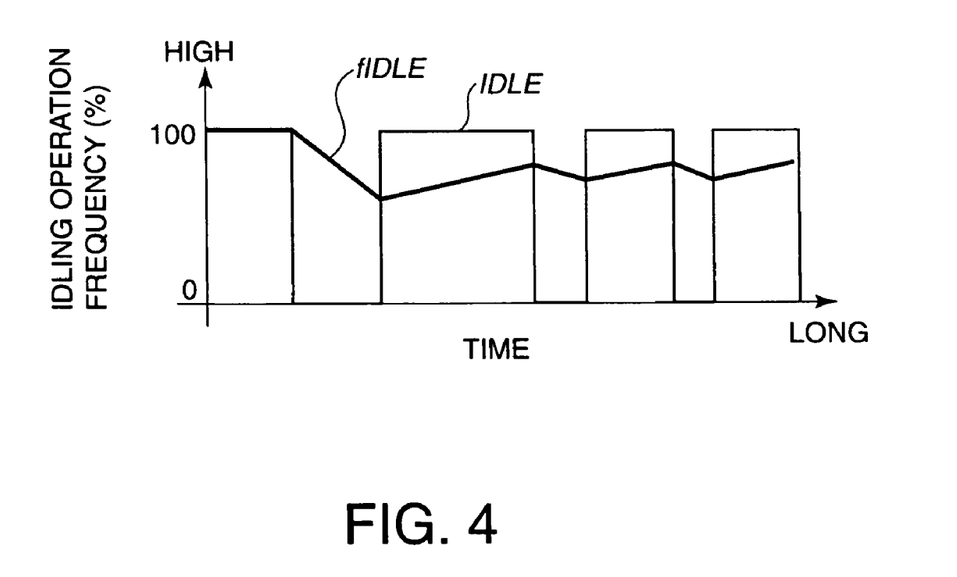
FIG. 4 is a timing chart describing first order delay processing of the idling operation frequency of a diesel engine, according to this invention.

Referring to FIG. 4, the idling operation frequency first order delay process value fIDLE will be described.

When the vehicle accelerates and decelerates repeatedly while driving through an urban area, the idling operation frequency IDLE switches between 100 percent and 0 percent according to the changes in operating condition. The idling operation frequency first order delay process value fIDLE, which is obtained by implementing first order delay processing on the idling operation frequency IDLE, is a value in which the influence of the acceleration and deceleration is evened out. The weighted average coefficient b is set by selecting an optimal value through experiment such that the idling operation frequency first order delay process value fIDLE properly represents the running pattern of the past five minutes. The idling operation frequency IDLE at the start of an execution of the routine is used as the initial value of the idling operation frequency first order delay process value fIDLE.

In a final step S8, the engine controller 31 stores the obtained bed temperature first order delay process value rTbed and idling operation frequency first order delay process value fIDLE in the memory (RAM), and then ends the routine.

The idling operation frequency first order delay process value fIDLE calculated in this routine denotes the idling operation frequency of the past five minutes. As the value of fIDLE increases, the idling operation frequency rises, indicating that the vehicle has been running in an urban area. As the value of fIDLE decreases, the idling operation frequency falls, indicating that the vehicle has been running at high speed.

As for the bed temperature first order delay process value rTbed, a high value indicates high speed running, whereas a low value indicates urban running.

Figure 5:
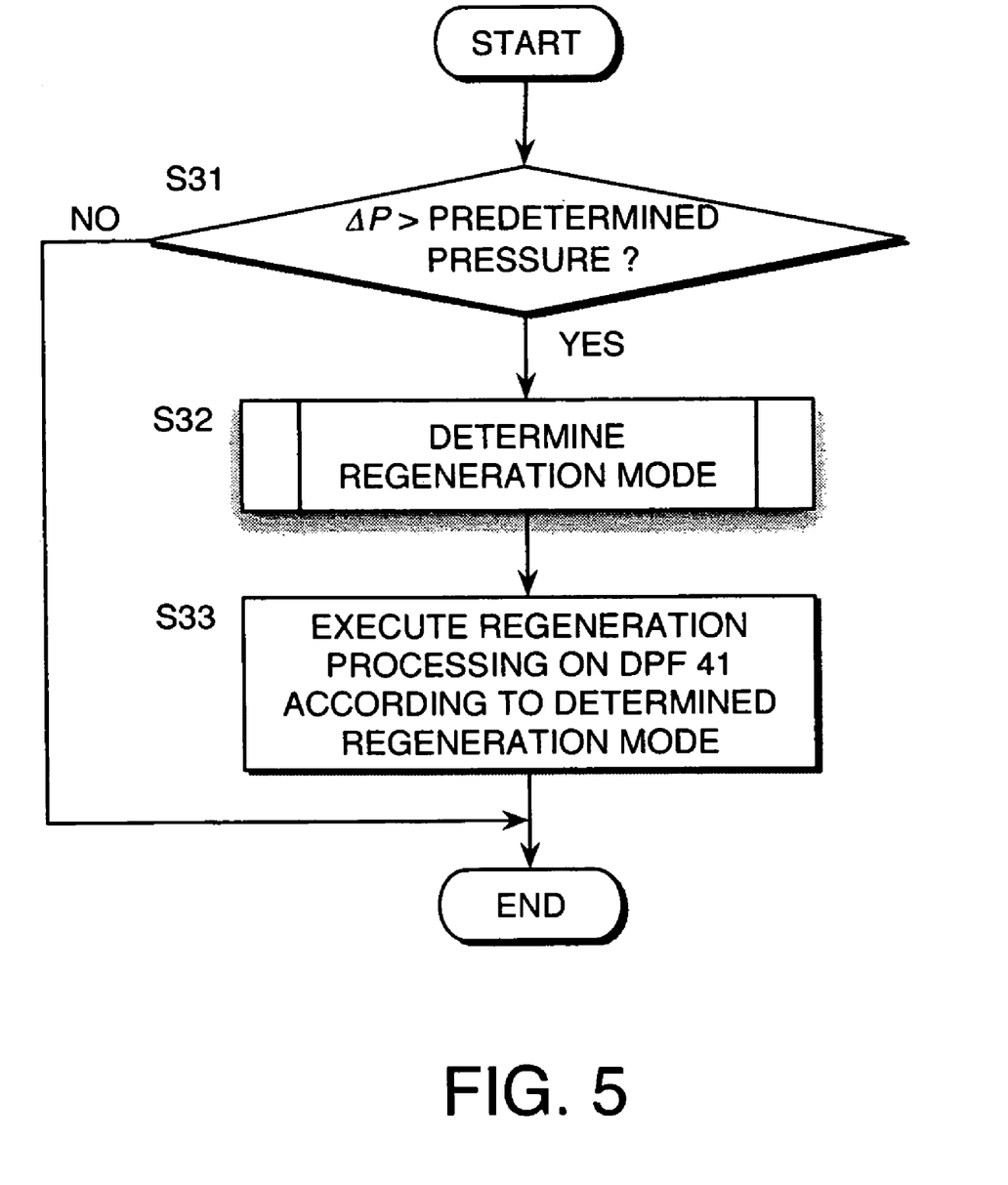
FIG. 5 is a flowchart describing a DPF regeneration routine performed by a controller according to this invention.

FIG. 5 shows a regeneration mode setting routine. The engine controller 31 executes this routine at five-minute intervals while the diesel engine 1 is operative.

In a step S31, the engine controller 31 determines whether or not the DPF 41 needs to be regenerated. Here, it is determined that regeneration of the DPF 41 is required when the differential pressure ΔP upstream and downstream of the DPF 41, detected by the differential pressure sensor 36, exceeds a predetermined pressure. The method disclosed in the aforementioned Tokkai Hei 05-44437 may be applied to the determination as to whether regeneration of the DPF 41 is required.

Next, in a step S32, the engine controller 31 determines the regeneration mode. A subroutine shown in FIG. 7 is used in this determination.

Figure 7:
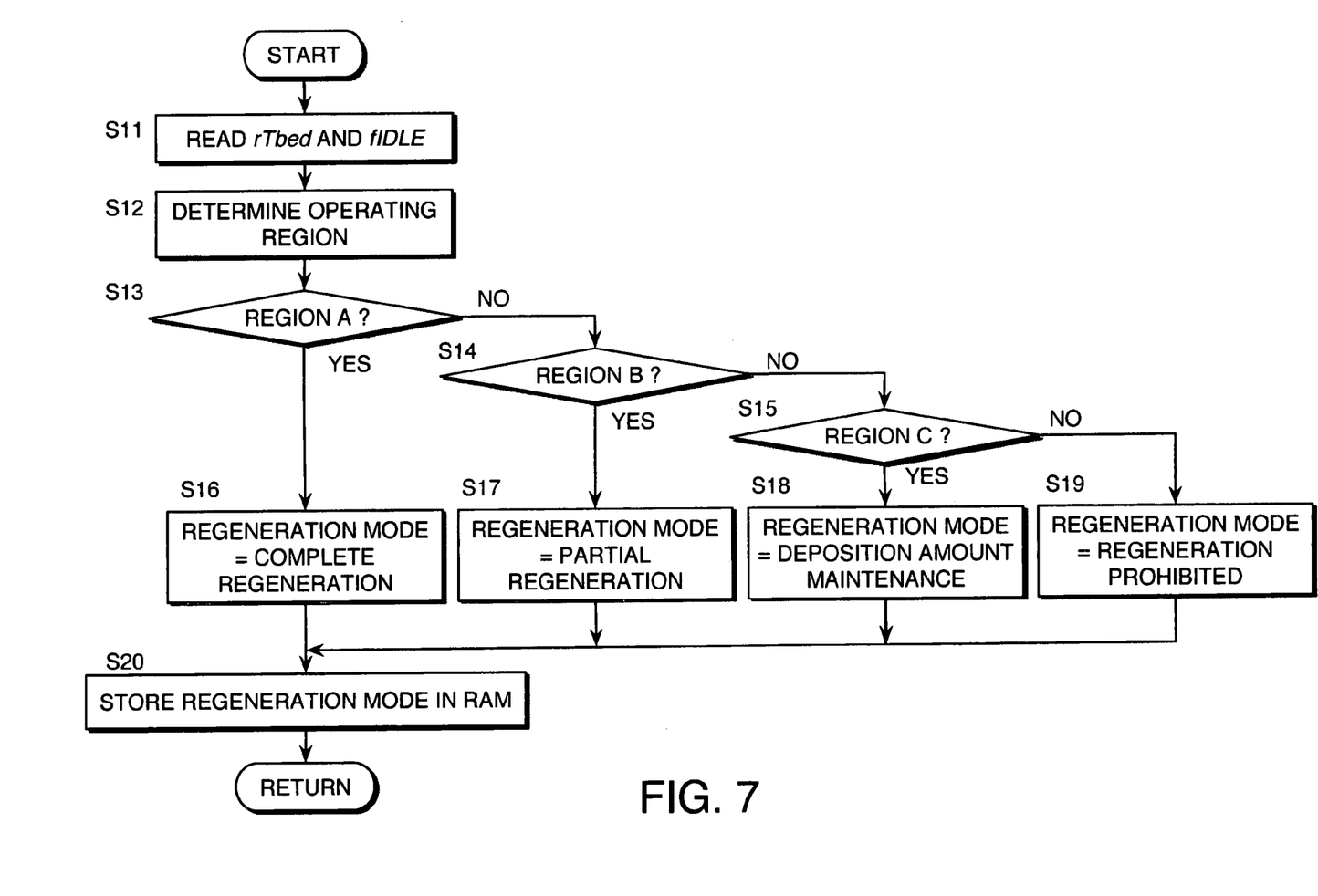
FIG. 7 is a flowchart describing a subroutine for setting a regeneration mode, performed by the controller.

Referring to FIG. 7, in a first step S11, the engine controller 31 reads the bed temperature first order delay process value rTbed and idling operation frequency first order delay process value fIDLE that are stored in the memory.

Figure 6:
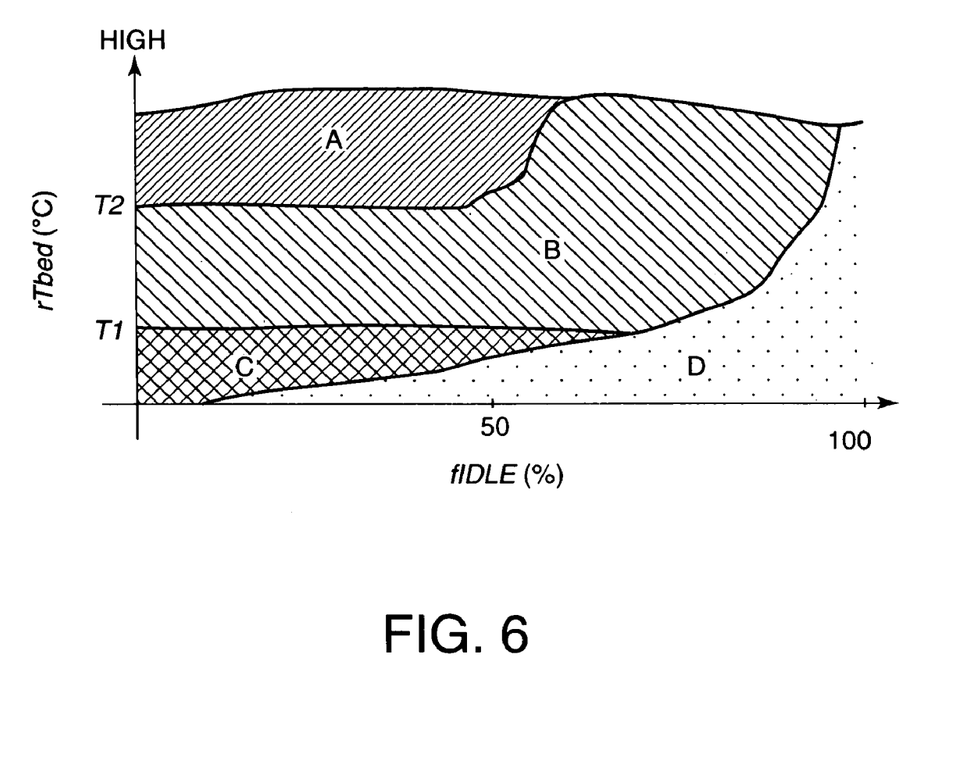
FIG. 6 is a diagram showing the characteristics of a map specifying DPF regeneration modes, stored by the controller.

Next, in a step S12, the engine controller 31 determines the operating region from the bed temperature first order delay process value rTbed and idling operation frequency first order delay process value fIDLE by referring to a map stored in the memory in advance and having the characteristics shown in FIG. 6.

Referring to FIG. 6, four operating regions are set in relation to the operating conditions of the diesel engine 1, from a region A, in which the bed temperature first order delay process value rTbed is large and the idling operation frequency first order delay process value fIDLE is small, to a region D, in which the bed temperature first order delay process value rTbed is small or the idling operation frequency first order delay process value fIDLE is large.

In a step S13, the engine controller 31 determines whether the operating condition corresponds to the region A, and if so, sets the regeneration mode to a complete regeneration mode in a step S16.

When the operating condition does not correspond to the region A in the step S13, the engine controller 31 determines whether the operating condition corresponds to a region B in a step S14. When the operating condition corresponds to the region B, the engine controller 31 sets the regeneration mode to a partial regeneration mode in a step S17.

When the operating condition does not correspond to the region B in the step S14, the engine controller 31 determines whether the operating condition corresponds to a region C in a step S15. When the operating condition corresponds to the region C, the engine controller 31 sets the regeneration mode to a deposition amount maintenance mode in a step S18.

When the operating condition does not correspond to the region C, then the operating condition corresponds to a region D. In this case, the engine controller 31 sets the regeneration mode to a regeneration prohibited mode in a step S19.

Following the processing of one of the steps S16–S19, the engine controller 31 stores the set regeneration mode in the memory in a step S20. Following the processing of the step S20, the engine controller 31 ends the subroutine.

Referring back to FIG. 5, after setting the regeneration mode in the step S32, the engine controller 31 executes regeneration processing on the DPF 41 in a following step S33 in accordance with the regeneration mode stored in the memory. After executing regeneration processing, the engine controller 31 ends the routine.

The regeneration mode and regeneration processing will now be described.

In the complete regeneration mode, all of the particulate matter deposited in the DPF 41 is burned. Burning all of the particulate matter deposited in the DPF 41 is realized when the bed temperature of the filter 41 is set to 600 degrees Centigrade or more and high speed running is performed continuously for approximately five minutes.

Referring to FIG. 6, the complete regeneration mode corresponds to a region in which the bed temperature first order delay process value rTbed is higher than a predetermined temperature T2, and the idling operation frequency first order delay process value fIDLE is less than 50 percent. The predetermined temperature T2 is set at 600 degrees Centigrade.

The reason for not including the region in which the idling operation frequency first order delay process value fIDLE is 50 percent or more in the complete regeneration mode is as follows.

When the idling operation frequency first order delay process value fIDLE exceeds 50 percent, there is a high probability that the vehicle is running in an urban or suburban area, and hence the high speed running that is required for regeneration processing in the complete regeneration mode is unlikely to be performed for the time being.

In the complete regeneration mode, the DPF 41 is regenerated without performing any special processing as the operating state suitable for complete regeneration is quite likely to continue for a long period. Therefore, substantially no operations are performed for regeneration processing in the complete regeneration mode.

The partial regeneration mode is a mode for burning a part of the particulate matter deposited in the filter 41 when it is impossible to burn all of the particulate matter deposited in the DPF 41.

Referring to FIG. 6, the partial regeneration mode corresponds to a region in which the bed temperature first order delay process value rTbed is lower than the predetermined temperature T2 but not lower than a predetermined temperature T1, and the idling operation frequency first order delay process value fIDLE is in a region other than the regeneration prohibited region in the vicinity of 100 percent. The predetermined temperature T1 is set at 400 degrees Centigrade.

When the vehicle runs in a suburban or urban area, five minutes of continuous high speed running cannot be expected. However, opportunities to regenerate the DPF 41 will almost never arise by simply waiting for the establishment of a condition in which five minutes of continuous high speed running is possible. The partial regeneration mode is set with the aim of increasing the opportunities for regeneration processing, while acknowledging that a part of the particulate matter in the DPF 41 will remain unburned, in order to reduce the amount of particulate matter deposited in the DPF 41 even if only slightly. By regenerating the DPF 41 in the partial regeneration mode repeatedly, all of the particulate matter deposited in the DPF 41 can be burned.

Regeneration processing in the partial regeneration mode involves engine control to raise the bed temperature with the aim of burning from 30 percent to 50 percent of the particulate matter deposition amount in the DPF 41. The bed temperature is raised by one or a combination of retarding the fuel injection timing of the nozzle 17, having the nozzle 17 execute a post-injection, retarding the post-injection timing, and reducing the opening of the intake throttle 42. All of these bed temperature raising methods are well-known.

In the deposition amount maintenance mode, processing is performed to prevent the amount of particulate matter deposited in the DPF 41 from increasing. When the bed temperature is approximately 400 degrees Centigrade, which is set as the predetermined temperature T1, regeneration of the DPF 41 is difficult. Hence measures are taken to ensure that the amount of particulate matter deposited in the DPF 41 does not increase until the bed temperature reaches an appropriate temperature for regenerating the DPF 41.

Referring to FIG. 6, the deposition amount maintenance mode corresponds to a region in which the bed temperature first order delay process value rTbed is less than the predetermined temperature T1, and the idling operation frequency first order delay process value fIDLE does not exceed approximately 70 percent.

Regeneration processing in the deposition amount maintenance mode is designed on the premise that approximately two grams of particulate matter remain the DPF 41 per one liter of the volume of the DPF 41. More specifically, this condition is satisfied by maintaining the bed temperature at the predetermined temperature T1 using the bed temperature raising methods described above.

In the regeneration prohibited mode, regeneration processing of the DPF 41 is prohibited.

Referring to FIG. 6, regeneration of the DPF 41 is impossible when the bed temperature first order delay process value rTbed is much lower than 400 degrees Centigrade even if the idling operation frequency first order delay process value fIDLE is small, or when the idling operation frequency first order delay process value fIDLE is much greater than 70 percent even if the bed temperature first order delay process value rTbed is high. In such regions, regeneration processing is prohibited. Hence, when the regeneration processing mode is set to regeneration prohibited in the step S19, no regeneration processing is performed in the step S33.

The characteristics shown in FIG. 6 differ according to the specifications of the diesel engine 1. Therefore, upon implementation, the boundaries of each region are set by performing matching according to the specifications of the diesel engine 1. The main subject of this invention is the way in which the regeneration mode is determined rather than the method by which regeneration processing is performed on the DPF 41. Any well-known technique may be applied to the regeneration processing method used on the DPF 41.

According to this invention as described above, the regeneration mode of the DPF 41 is determined from the vehicle running pattern for the past five minutes up to the present, and hence regeneration of the DPF 41 is performed appropriately in accordance with the vehicle running pattern. As a result, opportunities for regenerating the DPF 41 completely can be increased, and the number of interruptions in regeneration can be reduced.

The contents of Tokugan 2003-412120, with a filing date of Dec. 10, 2003 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

For example, in the embodiment described above, the bed temperature Tbed is determined as an average value of the inlet temperature Tin and outlet temperature Tout, but the bed temperature may be determined by subjecting the inlet temperature Tin to delay processing based on the exhaust gas discharge and the thermal capacity of the DPF 41. The bed temperature may also be detected directly using a sensor.

Further, the first parameter is not limited to the idling operation frequency first order delay process value fIDLE. For example, an average value of the idling operation frequency IDLE over a fixed time period may be used as the first parameter. Similarly, the second parameter is not limited to the bed temperature first order delay process value rTbed, and an average value of the bed temperature Tbed over a fixed time period, for example, may be used as the second parameter.

In the embodiment described above, with respect to the terminology in the claims, the temperature sensor 37 constitutes a first sensor, and the accelerator pedal depression sensor 32 constitutes a second sensor. Further, the idling operation frequency first order delay process value fIDLE constitutes a first parameter, and the bed temperature first order delay process value rTbed constitutes a second parameter.

The embodiments of this invention in which an exclusive property or privilege is claimed are defined as follows:

What is claimed is:

1. A control device for a regeneration mechanism of a filter which traps particulate matter contained in an exhaust gas of a diesel engine for a vehicle, comprising:
   a first sensor which detects whether or not the diesel engine is performing an idling operation;
   a second sensor which detects a temperature of the filter; and
   a programmable controller programmed to:
      calculate, on the basis of an output of the first sensor, a first parameter indicating a frequency with which the diesel engine performs an idling operation over a predetermined time period up to the present;
      calculate, on the basis of an output of the second sensor, a second parameter indicating a temperature environment of the filter over a predetermined time period up to the present;
      determine whether or not a complete regeneration of the filter is possible on the basis of the first parameter and second parameter; and
      control the regeneration mechanism to perform complete regeneration of the filter, when the complete regeneration of the filter is determined to be possible.

2. The control device as defined in claim 1, wherein the controller is further programmed to calculate the first parameter by implementing a first order delay process on a detected value of the first sensor.

3. The control device as defined in claim 2, wherein the controller is further programmed to determine that the complete regeneration is not possible when the first parameter exceeds a predetermined value.

4. The control device as defined in claim 1, wherein the controller is further programmed to calculate the second parameter by implementing the first order delay process on a detected value of the second sensor.

5. The control device as defined in claim 4, wherein the controller is further programmed to determine that the complete regeneration is not possible when the second parameter falls below a predetermined value.

6. The control device as defined in claim 1, wherein the second sensor comprises a sensor which detects an inlet temperature of the filter, the control device further comprises a sensor which detects an outlet temperature of the filter, and the controller is further programmed to calculate a bed temperature of the filter by averaging the inlet temperature and the outlet temperature, and calculate the first parameter on the basis of the bed temperature.

7. The control device as defined in claim 1, wherein the controller is further programmed to determine, on the basis of the first parameter and the second parameter, whether or not a partial regeneration of the filter is possible after determining that the complete regeneration is not possible, and control the regeneration mechanism to perform the partial regeneration of the filter, when the partial regeneration is determined to be possible.

8. The control device as defined in claim 7, wherein the controller is further programmed to determine, on the basis of the first parameter and second parameter, whether or not an execution of a deposition amount maintenance process on the filter to maintain a current particulate matter deposition amount is possible, after determining that the partial regeneration is not possible, and control the regeneration mechanism to execute the deposition amount maintenance process on the filter, when the execution of the process has been determined to be possible.

9. The control device as defined in claim 8, wherein the controller is further programmed to control the regeneration mechanism to prohibit regeneration of the filter after determining that the execution of the deposition amount maintenance process is not possible.

10. A control device for a regeneration mechanism of a filter which traps particulate matter contained in an exhaust gas of a diesel engine for a vehicle, comprising:
   means for determining whether or not the diesel engine is performing an idling operation;
   means for determining a temperature of the filter;
   means for calculating, on the basis of an output of the first sensor, a first parameter indicating a frequency with which the diesel engine performs an idling operation over a predetermined time period up to the present;
   means for calculating, on the basis of an output of the second sensor, a second parameter indicating a temperature environment of the filter over a predetermined time period up to the present;
   means for determining whether or not a complete regeneration of the filter is possible on the basis of the first parameter and second parameter; and
   means for controlling the regeneration mechanism to perform complete regeneration of the filter, when the complete regeneration of the filter is determined to be possible.

11. A control method for a regeneration mechanism of a filter which traps particulate matter contained in an exhaust gas of a diesel engine for a vehicle, comprising:
   determining whether or not the diesel engine is performing an idling operation;
   determining a temperature of the filter;
   calculating, on the basis of an output of the first sensor, a first parameter indicating a frequency with which the diesel engine performs an idling operation over a predetermined time period up to the present;
   calculating, on the basis of an output of the second sensor, a second parameter indicating a temperature environment of the filter over a predetermined time period up to the present;
   determining whether or not a complete regeneration of the filter is possible on the basis of the first parameter and second parameter; and
   controlling the regeneration mechanism to perform complete regeneration of the filter, when the complete regeneration of the filter is determined to be possible.

* * * * *